US012005553B2

(12) United States Patent
Fan et al.

(10) Patent No.: US 12,005,553 B2
(45) Date of Patent: Jun. 11, 2024

(54) FASTENER-DRIVING TOOL WITH ONE OR MORE COMBUSTION CHAMBERS AND AN EXHAUST GAS RECIRCULATION SYSTEM

(71) Applicant: Illinois Tool Works Inc., Glenview, IL (US)

(72) Inventors: Chinbay Q. Fan, Chicago, IL (US); Patrick Talano, Chicago, IL (US); James Haberstroh, Vernon Hills, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/306,751

(22) Filed: Apr. 25, 2023

(65) Prior Publication Data

US 2023/0256579 A1 Aug. 17, 2023

Related U.S. Application Data

(60) Division of application No. 17/133,916, filed on Dec. 24, 2020, now Pat. No. 11,642,767, which is a continuation of application No. 16/042,419, filed on Jul. 23, 2018, now Pat. No. 10,875,165.

(60) Provisional application No. 62/540,180, filed on Aug. 2, 2017.

(51) Int. Cl.

| | |
|---|---|
| ***B25C 1/08*** | (2006.01) |
| ***F01B 11/04*** | (2006.01) |
| ***F02B 63/02*** | (2006.01) |
| ***F02B 71/04*** | (2006.01) |

(52) U.S. Cl.

CPC ................ *B25C 1/08* (2013.01); *F01B 11/04* (2013.01); *F02B 63/02* (2013.01); *F02B 71/04* (2013.01)

(58) Field of Classification Search

CPC .. B25C 1/08; F01B 63/02; F02B 63/02; F02B 71/04

See application file for complete search history.

(56) References Cited

U.S. PATENT DOCUMENTS

| | | | |
|---|---|---|---|
| 32,452 | A | 5/1861 | Phelps |
| 1,271,942 | A | 7/1918 | Ricardo |
| 3,708,096 | A | 1/1973 | Burke |
| 3,891,036 | A | 6/1975 | Schmidt |
| 3,892,279 | A | 7/1975 | Amtsberg |
| 4,040,554 | A | 8/1977 | Haytayan |
| 4,075,850 | A | 2/1978 | Nakazato et al. |

(Continued)

FOREIGN PATENT DOCUMENTS

| | | | |
|---|---|---|---|
| EP | 0252653 | A1 | 1/1988 |
| EP | 0972614 | A2 | 1/2000 |

(Continued)

OTHER PUBLICATIONS

International Search Report and Written Opinion from International Application No. PCT/US2018/043469, dated Nov. 6, 2018 (14 pages).

*Primary Examiner* — Valentin Neacsu
*Assistant Examiner* — Scott A Howell
(74) *Attorney, Agent, or Firm* — Neal, Gerber & Eisenberg LLP

(57) ABSTRACT

Various embodiments of the present disclosure provide a combustion-powered fastener-driving tool including multiple combustion chambers and an exhaust gas recirculation system.

9 Claims, 2 Drawing Sheets

(56) References Cited

U.S. PATENT DOCUMENTS

| | | | |
|---|---|---|---|
| 4,365,471 | A | 12/1982 | Adams |
| 4,403,722 | A | 9/1983 | Nikolich |
| 4,483,473 | A | 11/1984 | Wagdy |
| 4,483,474 | A | 11/1984 | Nikolich |
| 4,522,162 | A | 6/1985 | Nikolich |
| 4,759,318 | A | 7/1988 | Adams |
| 4,909,419 | A | 3/1990 | Yamada et al. |
| 4,913,331 | A | 4/1990 | Utsumi et al. |
| 5,197,646 | A | 3/1993 | Nikolich |
| 5,263,439 | A | 11/1993 | Doherty et al. |
| 6,145,724 | A | 11/2000 | Shkolnikov et al. |
| 6,491,002 | B1 | 12/2002 | Adams |
| 6,755,159 | B1 * | 6/2004 | Adams ...................... B25C 1/08 123/46 R |
| 6,830,017 | B2 | 12/2004 | Wolf et al. |
| 6,912,988 | B2 | 7/2005 | Adams |
| 6,932,031 | B2 | 8/2005 | Adams |
| 7,201,301 | B2 | 4/2007 | Moeller et al. |
| 7,290,691 | B1 | 11/2007 | Wen |
| 7,293,684 | B1 | 11/2007 | Wen |
| 7,296,721 | B1 | 11/2007 | Wen |
| 7,341,171 | B2 | 3/2008 | Moeller et al. |
| 7,438,207 | B2 | 10/2008 | Wu et al. |
| 7,584,723 | B2 | 9/2009 | Shkolnikov et al. |
| 8,205,582 | B2 | 6/2012 | Adams |
| 8,347,832 | B2 | 1/2013 | Adams |
| 8,511,264 | B2 | 8/2013 | Adams |
| 8,511,528 | B2 * | 8/2013 | Oiwa ........................ B25C 1/08 123/262 |
| 8,925,517 | B2 | 1/2015 | Adams |
| 9,486,907 | B2 | 11/2016 | Birk |
| 9,492,915 | B2 | 11/2016 | Largo et al. |
| 9,638,092 | B2 | 5/2017 | Adams |
| 10,040,183 | B2 | 8/2018 | Zhao |
| 2002/0144498 | A1 | 10/2002 | Adams |
| 2003/0222114 | A1 | 12/2003 | Nishikawa et al. |
| 2004/0238588 | A1 | 12/2004 | Oda et al. |
| 2005/0098123 | A1 | 5/2005 | Miyata et al. |
| 2007/0119425 | A1 * | 5/2007 | Lewis ................. F02D 19/0636 123/492 |
| 2007/0131731 | A1 | 6/2007 | Moeller et al. |
| 2008/0179371 | A1 | 7/2008 | Gardner et al. |
| 2008/0190988 | A1 | 8/2008 | Pedicini et al. |
| 2008/0237295 | A1 * | 10/2008 | Adams ...................... B25C 1/08 123/46 SC |
| 2009/0230166 | A1 | 9/2009 | Yamamoto et al. |
| 2010/0065602 | A1 | 3/2010 | Zhao et al. |
| 2010/0108734 | A1 | 5/2010 | Ricardo |
| 2010/0230461 | A1 | 9/2010 | Tanaka |
| 2010/0327039 | A1 | 12/2010 | Adams |
| 2011/0079624 | A1 * | 4/2011 | Oiwa ........................ B25C 1/08 227/9 |
| 2011/0240709 | A1 | 10/2011 | Oouchi |
| 2011/0290850 | A1 | 12/2011 | Wu |
| 2012/0067935 | A1 | 3/2012 | Liu |
| 2013/0134204 | A1 | 5/2013 | Morioka et al. |
| 2016/0151900 | A1 | 6/2016 | Wu et al. |

FOREIGN PATENT DOCUMENTS

| | | | |
|---|---|---|---|
| EP | 1093886 | A2 | 4/2001 |
| EP | 2815851 | A2 | 12/2014 |

* cited by examiner

FASTENER-DRIVING TOOL WITH ONE OR MORE COMBUSTION CHAMBERS AND AN EXHAUST GAS RECIRCULATION SYSTEM

PRIORITY

This application is a divisional of, and claims priority to and the benefit of U.S. patent application Ser. No. 17/133,916, filed on Dec. 24, 2020, which is a continuation of, and claims priority to and the benefit of U.S. patent application Ser. No. 16/042,419, filed on Jul. 23, 2018, and issued as U.S. Pat. No. 10,875,165 on Dec. 29, 2020, which claims priority to and the benefit of U.S. Provisional Patent Application Ser. No. 62/540,180, filed Aug. 2, 2017, the entire contents of each of which are incorporated herein by reference.

FIELD

The present disclosure relates to fastener-driving tools. More specifically, the present disclosure relates to combustion-powered fastener-driving tools.

BACKGROUND

Powered fastener-driving tools use one of several types of power sources to carry out a fastener-driving cycle to drive a fastener (such as a nail or a staple) into a workpiece. A typical powered fastener-driving tool uses a power source to force a driving assembly, such as a piston carrying a driver blade, through a cylinder from a pre-firing position to a firing position. As the driving assembly moves to the firing position, the driver blade travels through a nosepiece, which guides the driver blade to contact a fastener housed in the nosepiece. Continued movement of the driving assembly through the cylinder toward the firing position forces the driver blade to drive the fastener from the nosepiece into the workpiece. The driving assembly is then forced back to the pre-firing position in a way that depends on the tool's construction and power source. A fastener-advancing device forces another fastener from a magazine into the nosepiece, and the tool is ready to fire again.

Combustion-powered fastener-driving tools use a small internal combustion assembly as their power source. To operate a typical combustion-powered fastener-driving tool, an operator depresses a workpiece-contact element of the tool onto a workpiece. This moves the workpiece-contact element from an extended position to a retracted position, which causes one or more mechanical linkages to cause: (1) a valve sleeve to move to a sealed position to seal a combustion chamber that is in fluid communication with the cylinder; (2) a fuel delivery system to dispense fuel from a fuel canister into the (now sealed) combustion chamber; and (3) a fan motor to drive a fan blade to mix air inside the combustion chamber with the fuel.

The operator then pulls the trigger to actuate a trigger switch, thereby causing a spark generator to deliver a spark and ignite the fuel/air mixture in the combustion chamber to start the fastener-driving cycle. This generates high-pressure combustion gases that expand and act on the piston to force the driving assembly to move through the cylinder from the pre-firing position to the firing position, thereby causing the driver blade to contact a fastener housed in the nosepiece and drive the fastener from the nosepiece into the workpiece.

Just before the driving assembly reaches the firing position, the piston passes exhaust check valves defined through the cylinder, and some of the combustion gases that propel the cylinder exhaust through the check valves to atmosphere. This combined with heat exchange to the atmosphere and the fact that the combustion chamber remains sealed during the fastener-driving cycle generates a vacuum pressure above the piston, which causes the driving assembly to retract to the pre-firing position to complete the fastener-driving cycle. When the operator removes the workpiece-contact element from the workpiece, a spring biases the workpiece-contact element from the retracted position to the extended position, causing the one or more mechanical linkages to move the valve sleeve to an unsealed position to unseal the combustion chamber. The fan motor continues to drive the fan blade to help exhaust residual combustion gases to atmosphere and draw fresh air into the combustion chamber in preparation for the next actuation.

A typical combustion-powered fastener-driving tool has some drawbacks. The use of a single combustion chamber in which to combust a relatively rich fuel/air mixture results in relatively inefficient combustion at high in-cylinder temperatures during and after combustion and the creation of objectionable exhaust fumes. The high in-cylinder temperatures cause soot to form on the combustion chamber and cylinder walls, which can eventually affect tool performance. Additionally, the fan motor and fan blade add size and weight to the tool, drain the tool's power source (e.g., battery), and introduce multiple potential failure points.

Also, in a typical combustion-powered fastener-driving tool, the conduit that routes fuel from the fuel canister to the combustion chamber can freeze when the operator actuates the tool several times in rapid succession, thus preventing rapid-fire functionality and, particularly, bump-fire functionality as is known in the art. This happens because once the vaporized fuel within the fuel canister is used (via the rapid successive actuations) the fuel canister begins dispensing much colder liquid fuel (since it hasn't had a chance to evaporate within the fuel canister). Another downside is that vaporized fuel is typically better suited for efficient combustion than liquid fuel, so any use of liquid fuel could result in poor tool performance.

SUMMARY

Various embodiments of the present disclosure provide a combustion-powered fastener-driving tool including a combustion chamber and an exhaust gas recirculation system.

Various embodiments of the present disclosure provide a combustion-powered fastener-driving tool including multiple combustion chambers and an exhaust gas recirculation system.

Various embodiments of the present disclosure provide a combustion-powered fastener-driving tool including multiple combustion chambers.

In various embodiments, the fastener-driving tool includes a housing, a first set of components at least partially within the housing that define a first combustion chamber having a first volume, and a second set of components at least partially within the housing that define a second combustion chamber having a second volume greater than the first volume. The second combustion chamber is in fluid communication with the first combustion chamber via multiple openings. The fastener-driving tool also includes a spark generator configured to generate a spark (or in some embodiments multiple sparks) within the first combustion chamber. The fastener-driving tool additionally includes a cylinder within the housing that defines a piston chamber that is in fluid communication with the second combustion chamber. A piston is in the piston chamber and is movable relative to the cylinder between a pre-firing position and a firing position. A driver blade is attached to the piston.

In various such embodiments, the fastener-driving tool includes a fuel-dispensing system that has a fuel-dispensing conduit in fluid communication with the first combustion chamber. The fuel-dispensing conduit includes a fuel-dispensing conduit outlet. The fuel-dispensing conduit is sized and shaped to route fuel from an outlet of a fuel canister to the fuel-dispensing conduit outlet.

In various such embodiments, the fastener-driving tool includes a workpiece-contact element movable relative to the housing between an extended position and a retracted position and one or more mechanical linkages connecting the workpiece-contact element to the fuel-dispensing system. When the fuel canister is received in the fuel-dispensing system, movement of the workpiece-contact element from the extended position to the retracted position causes a designated amount of fuel to be dispensed from the outlet of the fuel canister into the fuel-dispensing conduit.

In various embodiments, the fastener-driving tool also includes an exhaust gas recirculation (EGR) system configured to: (1) exhaust a first portion of the exhaust gas (produced by the combustion) to the atmosphere; (2) recirculate a second portion of the exhaust gas back into the combustion chambers and the cylinder to help cool them, help fuel/air mixing for the next actuation, and improve combustion efficiency; and/or (3) route a third portion of the exhaust gas below the piston to help return the piston to the pre-firing position.

In other various embodiments, the fastener-driving tool includes only one combustion chamber and an exhaust gas recirculation (EGR) system. In these embodiments, the exhaust gas recirculation (EGR) system is configured to: (1) exhaust a first portion of the exhaust gas (produced by the combustion) to the atmosphere; (2) recirculate a second portion of the exhaust gas back into the combustion chamber and the cylinder to help cool them, help fuel/air mixing for the next actuation, and improve combustion efficiency; and/or (3) route a third portion of the exhaust gas below the piston to help return the piston to the pre-firing position.

In various embodiments, the EGR system includes an EGR valve including an EGR valve inlet, an EGR valve recirculation outlet, an EGR valve exhaust outlet, an EGR valve piston chamber outlet, and an EGR conduit including an EGR conduit outlet. The EGR valve is movable between an open configuration in which the EGR valve enables fluid (which includes gases for this disclosure) to flow from the EGR valve inlet to the EGR valve recirculation outlet, the EGR valve exhaust outlet, and the EGR valve piston chamber outlet and a closed configuration in which the EGR valve prevents fluid from flowing from the EGR valve inlet to the EGR valve recirculation outlet, the EGR valve exhaust outlet, and the EGR valve piston chamber outlet.

In various embodiments, the EGR valve inlet is in fluid communication with the piston chamber via an EGR opening defined through the cylinder. The EGR valve recirculation outlet is in fluid communication with the EGR conduit. The EGR valve exhaust outlet in fluid communication with an exhaust conduit that is in fluid communication with the atmosphere. The EGR valve piston chamber outlet in fluid communication with a piston chamber conduit that is in fluid communication with the piston chamber between the bottom of the piston chamber and the piston when the piston is in the firing position.

In various such embodiments, the housing of the fastener-driving tool defines an air chamber in fluid communication with the EGR conduit outlet. The EGR conduit is positioned such that any exhaust gases exiting the EGR conduit outlet enters the air chamber and that at least some of any exhaust gases exiting the EGR conduit outlet contacts at least part of the fuel-dispensing conduit.

In various such embodiments, the fastener-driving tool also includes a first check valve configured to enable fluid to flow from the atmosphere into the air chamber and to prevent fluid from flowing from the air chamber to the atmosphere through the first check valve. The fastener-driving tool also includes a second check valve configured to enable fluid to flow from the air chamber to the first combustion chamber and to prevent fluid from flowing from the first combustion chamber to the air chamber. The fastener-driving tool also includes a third check valve configured to enable fluid to flow from the air chamber to the second combustion chamber and to prevent fluid from flowing from the second combustion chamber to the air chamber.

In operation of one example embodiment with two combustion chambers, an operator depresses the workpiece-contact element against a workpiece to move it from its extended position to its retracted position. This causes the fuel-dispensing system to cause the fuel canister to dispense vaporized fuel into the fuel-dispensing conduit, which routes the fuel to the fuel-dispensing conduit outlet and into the first combustion chamber. Given the relatively small size of the first combustion chamber and the pressurization of the fuel, the fuel turbulently mixes with the air inside the first combustion chamber to form a relatively high-pressure, rich fuel-air mixture. Some of the fuel flows through the openings into the second combustion chamber where it mixes with air to form a relatively low-pressure, lean fuel-air mixture.

The operator then pulls a trigger to actuate a trigger switch, which causes a controller to cause the spark generator to generate one (or more) sparks in the first combustion chamber. The sparks ignite the fuel/air mixture in the first combustion chamber to form jet flames that inject through the openings into the second combustion chamber. This causes the fuel/air mixture in the second combustion chamber to ignite and generate a pressure spike that forces the piston to move from the pre-firing position toward the firing position. Air below the piston is exhausted to atmosphere through a vent opening defined through the cylinder.

Once the piston travels past the EGR openings, the controller controls the EGR valve to move from the closed configuration to the open configuration. The hot, high-pressure exhaust gases travel through the EGR openings into the EGR valve inlet. The EGR valve routes: (1) a first portion of the exhaust gases to the EGR valve exhaust outlet, and they escape to atmosphere via the exhaust conduit; (2) a second portion of the exhaust gases to the EGR valve recirculation outlet, and they flow to the air chamber via the EGR conduit; and/or (3) a third portion of the exhaust gases to the EGR valve piston chamber outlet, and they flow to the piston chamber via the piston chamber conduit.

The hot exhaust gases exit the EGR conduit adjacent the fuel-dispensing conduit and warm the fuel-dispensing conduit. This enables rapid-fire functionality because even if the fuel canister dispenses liquid fuel, the fuel-dispensing conduit is hot enough to vaporize the liquid fuel before it reaches the first combustion chamber.

The effect caused by the exhausting of some of the exhaust gases to the atmosphere, the recirculation of some of the exhaust gases, and the cooling of the combustion chambers and the cylinder causes relatively cool fresh air to be drawn through the first check valve into the air chamber and through the second and third check valves and into the first and second combustion chambers, respectively, where it convectively mixes with the recirculated exhaust gases (due to their temperature difference).

After the piston reaches the firing position, drives a fastener into the workpiece, and contacts the bumper at the bottom of the piston chamber, the combination of the pressurized exhaust gases routed below the piston, the resiliency of the bumper, the recoil of the fastener-driving operation, and a slight vacuum created above the piston due to thermodynamic effects causes the piston to move from the firing position back to the pre-firing position, and the tool is ready for another actuation.

The tool of various embodiments of the present disclosure improves upon existing combustion-powered fastener-driving tools. In the embodiments with two combustion chambers, the fact that the first combustion chamber is smaller than the second combustion chamber and that they are in fluid communication via multiple openings means that after the fuel canister dispenses fuel, a relatively rich fuel/air mixture is present in the first combustion chamber and a relatively lean fuel/air mixture is present in the second combustion chamber. Also, the relatively rich fuel/air mixture in the first combustion chamber is more pressurized than the relatively lean fuel/air mixture in the second combustion chamber, meaning that is it well-mixed. These factors collectively lower the combustion temperature and provide a more efficient combustion (as compared to various existing combustion-powered fastener-driving tools), which reduces formation of soot and objectionable exhaust fumes.

The use of the EGR system in combination with one or more combustion chambers also aids in thermal efficiency by diluting the incoming fresh air with exhaust gases. These exhaust gases are all or mostly comprised of noncombustible gases that don't combust during the next actuation (although small amounts of the exhaust gases may be combustible and combust), and act as absorbents of combustion heat.

In the embodiments with two combustion chambers, the fact that turbulent fuel/air mixing occurs in the first combustion chamber and the use of the EGR system to cause convective mixing of the recirculated exhaust gases and incoming fresh air and to cool the cylinder and the combustion chambers eliminate the need for a fan motor and a fan blade. This enables reduction in tool size and weight, reduces power consumption, and eliminates multiple failure points.

Also, the positioning of the EGR conduit adjacent the fuel-dispensing conduit prevents the fuel-dispensing conduit from freezing and ensures that fuel entering the first combustion chamber is vaporized, even if the fuel canister dispenses it as liquid. This enables rapid-fire functionality (and bump-fire functionality).

DETAILED DESCRIPTION

Figure 1:
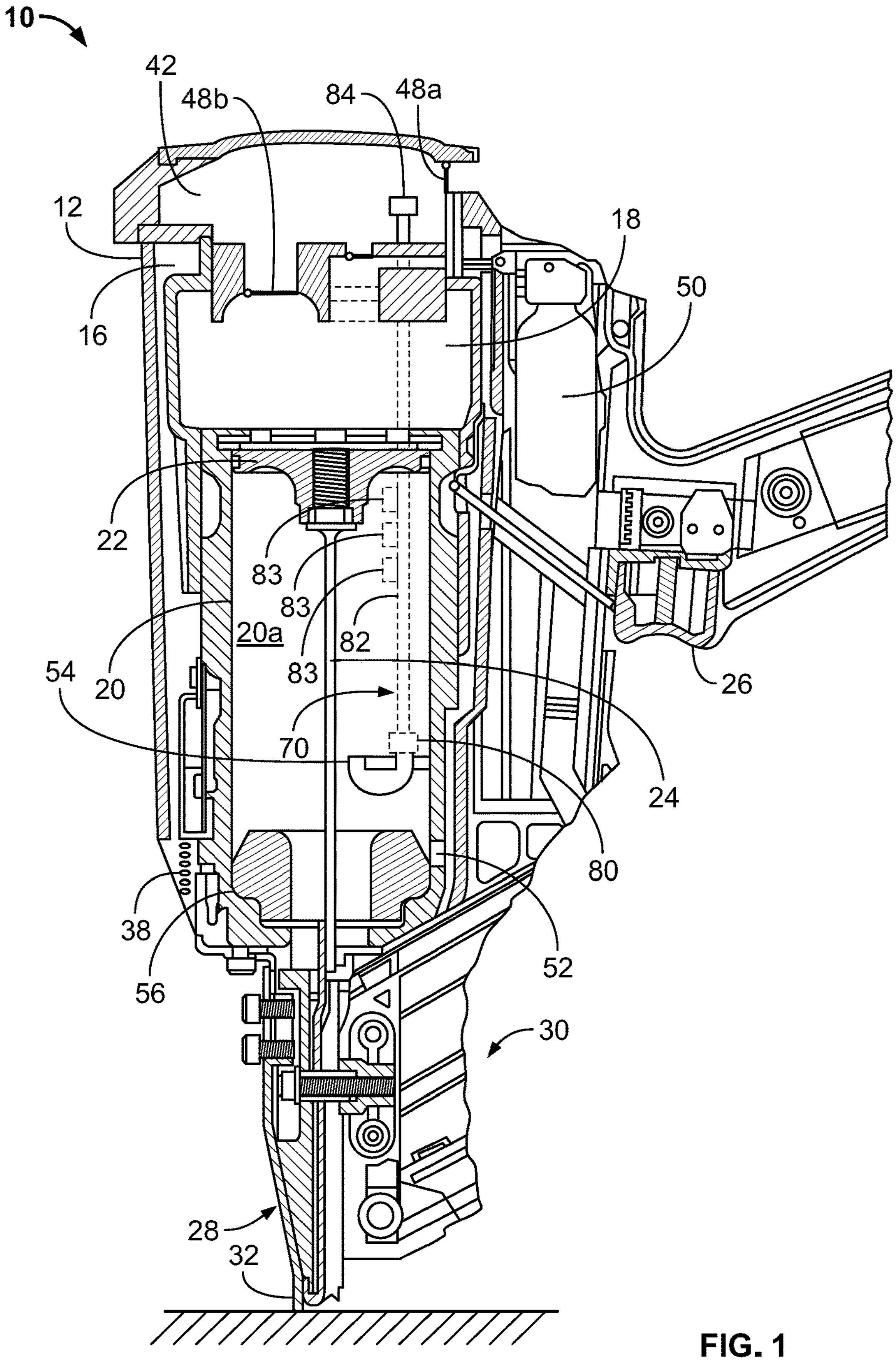
FIG. 1 is a cross-sectional side elevational view of one example embodiment of the combustion-powered fastener-driving tool of the present disclosure.

While the features, devices, and systems described herein may be embodied in various forms, the drawings show and the specification describes some exemplary and non-limiting embodiments. Not all of the components shown in the drawings and described in the specification may be required, and some implementations may include additional, different, or fewer components. Variations in the arrangement and type of the components; the shapes, sizes, and materials of the components; and the manners of attachment and connections of the components may be made without departing from the spirit or scope of the claims. Unless otherwise indicated, any directions referred to in the specification reflect the orientations of the components shown in the corresponding drawings and do not limit the scope of the present disclosure. This specification is intended to be taken as a whole and interpreted in accordance with the principles of the invention and as understood by one of ordinary skill in the art.

Various embodiments of the present disclosure provide a combustion-powered fastener-driving tool including multiple combustion chambers.

Various embodiments of the present disclosure provide a combustion-powered fastener-driving tool including a combustion chamber and an exhaust gas recirculation system.

Various embodiments of the present disclosure provide a combustion-powered fastener-driving tool including multiple combustion chambers and an exhaust gas recirculation system.

For brevity, the various embodiments of the present disclosure that provide a combustion-powered fastener-driving tool including multiple combustion chambers and an exhaust gas recirculation (EGR) system is the primary example described in detail here. However, it should be appreciated that such description is not meant to limit the scope of the present disclosure to this described example embodiment.

Figure 2:
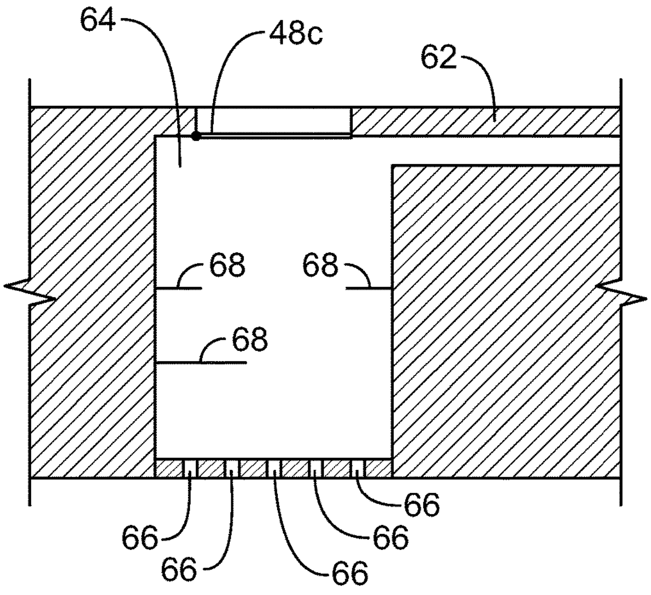
FIG. 2 is a fragmentary cross-sectional side elevational view of the first combustion chamber of the combustion-powered fastener-driving tool of FIG. 1.
Figure 3:
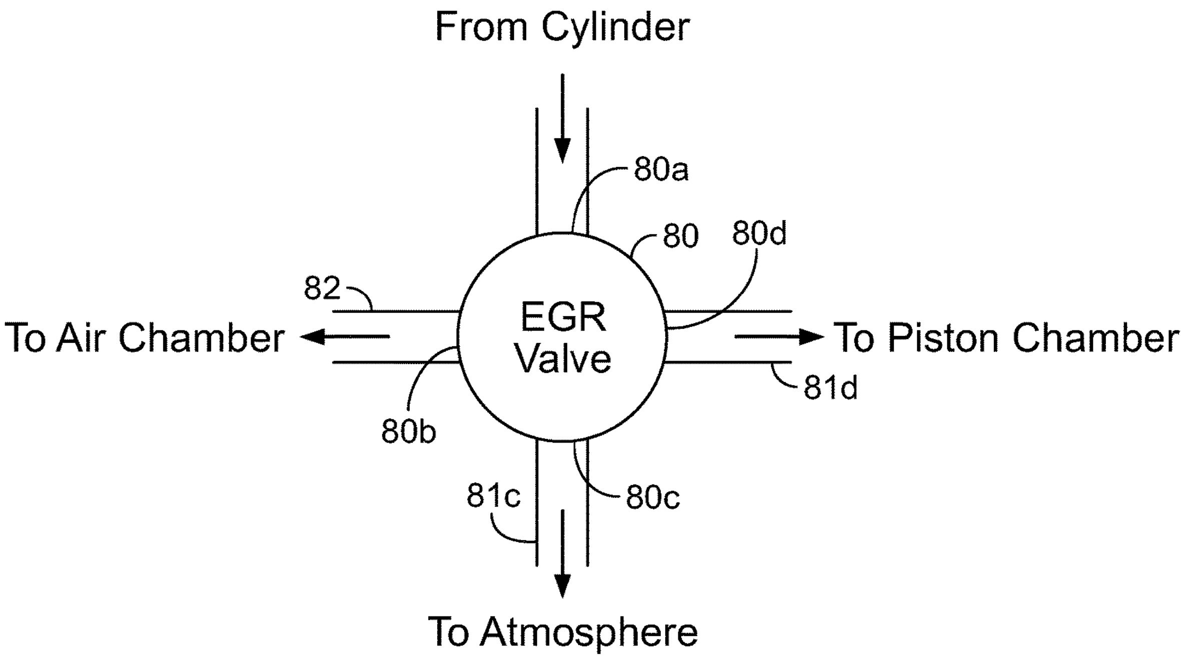
FIG. 3 is a schematic of the EGR valve, part of the EGR conduit, part of the exhaust conduit, and part of the piston chamber conduit of the combustion-powered fastener-driving tool of FIG. 1.

FIGS. 1, 2, and 3 illustrate one example embodiment of the combustion-powered fastener-driving tool 10 (sometimes referred to as the "tool" for brevity) or its components. Since certain portions of the tool 10—such as a workpiece contact element and associated linkage(s), a fuel canister and associated fuel-dispensing system, and a trigger and associated trigger switch—are well-known in the art, they are only generally described below.

The tool 10 includes a housing 12 that defines a housing main chamber 16 and an air chamber 42 above the housing main chamber 16. A first set of components (not labeled) at least partially within the housing main chamber 16 define a first combustion chamber 64 (FIG. 2), and a second set of components (not labeled) at least partially within the housing main chamber 16 define a second combustion chamber 18. The first combustion chamber 64 and the second combustion chamber 18 are in fluid communication via multiple openings 66 (FIG. 2), which may take any suitable shape. The first combustion chamber 64 has a first volume, and the second combustion chamber 18 has a second volume that is greater than the first volume. In various embodiments, the first volume is 1.4% to 7.4% of the second volume. In certain embodiments, the first volume is 2.4% to 3.7% of the second volume.

The tool 10 includes a first check valve **48*a* configured to enable fluid to flow from the atmosphere into the air chamber 42 and to prevent fluid from flowing from the air chamber 42 to the atmosphere through the first check valve 48*a*. The tool 10 includes a second check valve 48*b* configured to enable fluid to flow from the air chamber 42 into the second combustion chamber 18 and to prevent fluid from flowing from the second combustion chamber 18 to the air chamber 42 through the second check valve 48*b*. The tool 10** includes a third check valve 48*c* (FIG. 2) configured to enable fluid to flow from the air chamber 42 into the first combustion chamber 64 and to prevent fluid from flowing from the first combustion chamber 64 to the air chamber 42 through the third check valve 48*c*.

A cylinder 20 is positioned at least partially within the housing main chamber 16 below the second combustion chamber 18. The cylinder 20 defines a cylindrical piston chamber 20*a*, which is in fluid communication with the second combustion chamber 18. An elastomeric bumper 56 is positioned in the cylinder 20 at the bottom end of the piston chamber 20*a*. A piston 22 is positioned in the piston chamber 20*a* and is movable relative to the cylinder 20 between a pre-firing position (FIG. 1) and a firing position (not shown) in which the piston 22 contacts the bumper 56. A driver blade 24 is attached to the piston 22 and moves with the piston 22.

One or more vent openings 52 are defined through the cylinder 20 such that the piston chamber 20*a* is in fluid communication with the atmosphere via the vent openings 52. In this embodiment, the vent openings 52 are positioned between the bottom of the piston chamber 20*a* and the bottom of the piston 22 when the piston 22 is in the firing position. As described below, air below the piston 22 escapes to the atmosphere through the vent openings 52 as the piston 22 moves from the pre-firing position to the firing position during actuation of the tool 10.

One or more EGR openings 54 are also defined through the cylinder 20 such that the piston chamber 20*a* is in fluid communication with an EGR valve 80 via the EGR openings 54. The EGR openings 54 are fitted with reed valves (or any other suitable check valves) to prevent backflow, though in other embodiments they are not. In this embodiment, the one or more EGR openings are positioned between the top of the piston chamber 20*a* and the top of the piston 22 when the piston 22 is in the firing position.

A trigger 26 is movable relative to the housing 12 between a rest position and an actuated position. A biasing element (not labeled) biases the trigger 26 to the rest position. When the trigger 26 moves from the rest position to the actuated position, a trigger switch (not shown) is actuated. The trigger switch is communicatively connected (either directly or indirectly, such as via a controller) to a spark generator 68. The spark generator 68 generates a spark (or in some embodiments, multiple sparks) responsive to actuation of the trigger switch to initiate combustion of the fuel/air mixture in the first combustion chamber 18, as described in detail below.

A nosepiece 28 is connected to the bottom of the cylinder 20 and the housing 12. The nosepiece 28 defines a drive channel (not labeled) sized and shaped to receive the driver blade 24. A magazine 30 is connected to the nosepiece 28 and configured to receive a fastener strip. The magazine includes a biasing element configured to urge the fastener strip toward the nosepiece 28 such that the fastener at the end of the fastener strip is in the drive channel below the driver blade 24. When the piston 22 moves from the pre-firing position to the firing position, the driver blade 24 contacts the fastener in the drive channel, shears it off the fastener strip, and forces it downward out of the drive channel and into a workpiece.

The nosepiece 28 includes a workpiece-contact element (WCE) 32. The WCE 32 is movable between an extended position (not shown) and a retracted position (FIG. 1). A biasing element 38 biases the WCE 32 to the extended position. One or more mechanical linkages (not shown) connect the WCE 32 to a fuel-dispensing system (not labeled).

The fuel-dispensing system is configured to receive a fuel canister 50 and to route fuel dispensed from the fuel canister 50 to the first combustion chamber 64 via a fuel-dispensing conduit 62 (FIG. 2). More specifically, when a fuel canister 50 is received in the fuel-dispensing system, movement of the WCE 32 from the extended position to the retracted position causes the fuel-dispensing system to cause the fuel canister 50 to dispense fuel into the fuel-dispensing conduit 62. The fuel travels through the fuel-dispensing conduit 62 and exits the fuel-dispensing conduit 62 via a fuel-dispensing conduit outlet into the first combustion chamber 64 (FIG. 2).

The fastener-driving tool 10 also includes an EGR system 70. The EGR system 70 includes an EGR valve 80 including an EGR valve inlet 80*a*, an EGR valve recirculation outlet 80*b*, an EGR valve exhaust outlet 80*c*, an EGR valve piston chamber outlet 80*d*, an EGR conduit 82 including an EGR conduit outlet 84, and multiple heat sinks 83. The EGR valve 70 is movable between an open configuration in which the EGR valve 70 enables fluid to flow from the EGR valve inlet 80*a* to the EGR valve recirculation outlet 80*b*, the EGR valve exhaust outlet 80*c*, and the EGR valve piston chamber outlet 80*d* and a closed configuration in which the EGR valve 70 prevents fluid from flowing from the EGR valve inlet 80*a* to the EGR valve recirculation outlet 80*b*, the EGR valve exhaust outlet 80*c*, and the EGR valve piston chamber outlet 80*d*.

The EGR valve inlet 80*a* is in fluid communication with the piston chamber 20*a* via the EGR openings 54 defined through the cylinder 20. The EGR valve recirculation outlet 80*b* is in fluid communication with the EGR conduit 82. The EGR valve exhaust outlet 80*c* in fluid communication with an exhaust conduit 81*c* that is in fluid communication with the atmosphere. The EGR valve piston chamber outlet 80*d* is in fluid communication with a piston chamber conduit 81*d* that is in fluid communication with the piston chamber 20*a* between the bottom of the piston chamber 20*a* and the bottom of the piston 22 when the piston 22 is in the firing position.

An EGR conduit check valve (not labeled) is configured to enable fluid to flow from the EGR valve recirculation outlet 80*b* through the EGR conduit 82 to the air chamber 42 and to prevent fluid from flowing from the air chamber 42 through the EGR conduit 82 to the EGR valve recirculation outlet 80*b*. In other embodiments, the tool doesn't include the EGR conduit check valve.

An exhaust check valve (not labeled) is configured to enable fluid to flow from the EGR valve exhaust outlet 80*c* through the exhaust conduit 81*c* to the atmosphere and to prevent fluid from flowing from the atmosphere through the exhaust conduit 81*c* to the EGR valve exhaust outlet 80*c*. In other embodiments, the tool doesn't include the exhaust check valve.

A piston chamber check valve (not labeled) is configured to enable fluid to flow from the EGR valve piston chamber outlet 80*d* through the piston chamber conduit 81*d* to the piston chamber 20*a* and to prevent fluid from flowing from the piston chamber 20*a* through the piston chamber conduit 81*d* to the EGR valve piston chamber outlet 80*d*. In other embodiments, the tool doesn't include the piston chamber check valve.

In this embodiment, the EGR valve includes a solenoid valve controlled by the controller of the tool. The controller may control movement of the EGR valve between the closed and open configurations in any suitable manner, such as based on time elapsed following actuation of the trigger switch or feedback of sensors that detect the position of the piston relative to the EGR openings. In other embodiments, the EGR valve includes a collection of check valves or any other suitable valve(s). In various embodiments, the EGR valve is modifiable to enable the operator or manufacturer to customize how much of the exhaust gases the EGR valve routes to each of its different outlets.

In other embodiments, the EGR valve does not include an EGR valve piston chamber outlet, and the EGR system does not include the piston chamber conduit. In these embodiments, the EGR system does not route exhaust gases back into the piston chamber between the bottom of the piston chamber and the bottom of the piston to help return the piston to the pre-firing position.

The air chamber 42 is in fluid communication with the EGR conduit outlet 84 and, particularly, the EGR conduit outlet 84 is positioned within the air chamber 42. The EGR conduit 82 is positioned such that any exhaust gases exiting the EGR conduit outlet 84 enter the air chamber 42 and such that at least some of any exhaust gases exiting the EGR conduit 84 outlet contact at least part of the fuel-dispensing conduit 62.

The heat sinks 83, which may be any suitable type of heat sinks, are connected to the EGR conduit 82 and configured to draw heat from the exhaust gases flowing within the EGR conduit 82.

In operation of this embodiment, an operator depresses the WCE 32 against a workpiece to move it from its extended position to its retracted position. This causes the fuel-dispensing system to cause the fuel canister 50 to dispense vaporized fuel into the fuel-dispensing conduit 62, which routes the fuel to the fuel-dispensing conduit outlet and into the first combustion chamber 64. Given the relatively small size of the first combustion chamber 64 and the pressurization of the fuel, the fuel turbulently mixes with the air inside the first combustion chamber 64 to form a relatively high-pressure, rich fuel-air mixture. Some of the fuel flows through the openings 66 into the second combustion chamber 18 where it mixes with air to form a relatively low-pressure, lean fuel-air mixture. In certain embodiments, the air-to-fuel equivalence ratio in the first combustion chamber 64 is less than 1 and the air-to-fuel equivalence ratio in the second combustion chamber 18 is greater than 1 just before combustion. The air-to-fuel equivalence ratio (sometimes identified as $\lambda$) is the ratio of actual air-to-fuel ratio to stoichiometry for a given mixture.

The operator then pulls the trigger 26 to actuate the trigger switch, which causes the controller to cause the spark generator 68 to generate one (or more) sparks in the first combustion chamber 64. The sparks ignite the fuel/air mixture in the first combustion chamber 64 to form jet flames that inject through the openings 66 into the second combustion chamber 18. This causes the fuel/air mixture in the second combustion chamber 18 to ignite and generate a pressure spike that forces the piston 22 to move from the pre-firing position toward the firing position. Air below the piston 22 is exhausted to atmosphere through the vent opening 52 defined through the cylinder 20.

Once the piston 22 travels past the EGR openings 54, the controller controls the EGR valve 80 to move from the closed configuration to the open configuration. The hot, high-pressure exhaust gases travel through the EGR openings 54 into the EGR valve inlet 80*a*. The EGR valve 80 routes: (1) a first portion of the exhaust gases to the EGR valve exhaust outlet 80*c*, and they escape to atmosphere via the exhaust conduit 81*c*; (2) a second portion of the exhaust gases to the EGR valve recirculation outlet 80*b*, and they flow to the air chamber 42 via the EGR conduit 82; and (3) a third portion of the exhaust gases to the EGR valve piston chamber outlet 80*d*, and they flow to the piston chamber 20*a* via the piston chamber conduit 81*d*. In one embodiment, the first portion comprises 65% of the exhaust gases, the second portion comprises 20% of the exhaust gases, and the third portion comprises 15% of the exhaust gases. These percentages may vary across other embodiments to achieve desired operation of the tool.

The hot exhaust gases exit the EGR conduit 82 adjacent the fuel-dispensing conduit 62 and warm the fuel-dispensing conduit 62. This enables rapid-fire functionality because even if the fuel canister 50 dispenses liquid fuel, the fuel-dispensing conduit 62 is hot enough to vaporize the liquid fuel before it reaches the first combustion chamber 64.

The effect caused by the exhausting of some of the exhaust gases to the atmosphere, the recirculation of some of the exhaust gases, and the cooling of the combustion chambers 64 and 18 and the cylinder 20 causes relatively cool fresh air to be drawn through the first check valve 48*a* into the air chamber 42 and through the second and third check valves 48*b* and 48*c* into the first and second combustion chambers 64 and 18, respectively, where it convectively mixes with the recirculated exhaust gases (due to their temperature difference).

After the piston 22 reaches the firing position, drives a fastener into the workpiece, and contacts the bumper 56 at the bottom of the piston chamber 20*a*, the combination of the pressurized exhaust gases routed below the piston 22, the resiliency of the bumper 56, the recoil of the fastener-driving operation, and a slight vacuum created above the piston 22 due to thermodynamic effects causes the piston 22 to move from the firing position back to the pre-firing position, and the tool is ready for another actuation.

The tool of the present disclosure improves upon existing combustion-powered fastener-driving tools. The fact that the first combustion chamber is smaller than the second combustion chamber and that they are in fluid communication via multiple openings means that after the fuel canister dispenses fuel, a relatively rich fuel/air mixture is present in the first combustion chamber and a relatively lean fuel/air mixture is present in the second combustion chamber. Also, the relatively rich fuel/air mixture in the first combustion chamber is more pressurized than the relatively lean fuel/air mixture in the second combustion chamber, meaning that is it well-mixed. These factors collectively lower the combustion temperature and provide a more efficient combustion (as compared to existing combustion-powered fastener-driving tools), which reduces formation of soot and objectionable exhaust fumes. The use of the EGR system also aids in thermal efficiency by diluting the incoming fresh air with exhaust gases. These exhaust gases are all or mostly comprised of noncombustible gases that don't combust during the next actuation (although small amounts of the exhaust gases may be combustible and combust), and act as absorbents of combustion heat.

The fact that turbulent fuel/air mixing occurs in the first combustion chamber and the use of the EGR system to cause convective mixing of the recirculated exhaust gases and incoming fresh air and to cool the cylinder and the combustion chambers eliminate the need for a fan motor and a fan blade. This enables reduction in tool size and weight, reduces power consumption, and eliminates multiple failure points. Also, the positioning of the EGR conduit adjacent the fuel-dispensing conduit prevents the fuel-dispensing conduit from freezing and ensures that fuel entering the first combustion chamber is vaporized, even if the fuel canister dispenses it as liquid. This enables rapid-fire functionality (and bump-fire functionality).

In other embodiments, the tool includes a smaller fan blade and/or fan motor than that used in a typical combustion-powered fastener-driving tool. The fan blade helps mix fuel and air and exhaust gases in the combustion chambers.

It should be appreciated that, as mentioned above, in alternative embodiments, the fastener driving tool includes the multiple combustion chambers but does not include EGR system.

It should be appreciated that, as also mentioned above, in other alternative embodiments, the fastener driving tool includes one or a single combustion chamber and an EGR system.

It should be appreciated from the above, that in various embodiments, the present disclosure provides a fastener-driving tool comprising: a housing; a first set of components at least partially within the housing that define a first combustion chamber having a first volume; a spark generator configured to generate a spark within the first combustion chamber; a second set of components at least partially within the housing that define a second combustion chamber having a second volume greater than the first volume, wherein the second combustion chamber is in fluid communication with the first combustion chamber via multiple openings; a cylinder within the housing and defining a piston chamber that is in fluid communication with the second combustion chamber; a piston in the piston chamber and movable relative to the cylinder between a pre-firing position and a firing position; and a driver blade attached to the piston.

In various such embodiments, the fastener-driving tool further includes a fuel-dispensing system having a fuel-dispensing conduit in fluid communication with the first combustion chamber, the fuel-dispensing conduit comprising a fuel-dispensing conduit outlet.

In various such embodiments of the fastener-driving tool, the fuel-dispensing conduit is sized and shaped to route fuel from an outlet of a fuel canister to the fuel-dispensing conduit outlet.

In various such embodiments, the fastener-driving tool further includes a workpiece-contact element movable relative to the housing between an extended position and a retracted position; and one or more mechanical linkages connecting the workpiece-contact element to the fuel-dispensing system such that, when the fuel canister is received in the fuel-dispensing system, movement of the workpiece-contact element from the extended position to the retracted position causes the fuel to be dispensed from the outlet of the fuel canister into the fuel-dispensing conduit.

In various such embodiments, the fastener-driving tool further includes an exhaust gas recirculation (EGR) valve comprising an EGR valve inlet and an EGR valve recirculation outlet, wherein the EGR valve inlet is in fluid communication with the piston chamber via an EGR opening defined through the cylinder.

In various such embodiments of the fastener-driving tool, the EGR valve is movable between an open configuration in which the EGR valve enables fluid to flow from the EGR valve inlet to the EGR valve recirculation outlet and a closed configuration in which the EGR valve prevents fluid from flowing from the EGR valve inlet to the EGR valve recirculation outlet.

In various such embodiments of the fastener-driving tool, the EGR valve further includes an EGR valve exhaust outlet in fluid communication with an exhaust conduit that is in fluid communication with the atmosphere, wherein the EGR valve enables fluid to flow from the EGR valve inlet to the EGR valve exhaust outlet when in the open configuration and prevents fluid from flowing from the EGR valve inlet to the EGR valve exhaust outlet when in the closed configuration.

In various such embodiments, the fastener-driving tool further includes a check valve in fluid communication with the exhaust conduit and configured to enable fluid to flow from the EGR valve exhaust outlet through the exhaust conduit to the atmosphere and to prevent fluid from flowing from the atmosphere through the exhaust conduit to the EGR valve exhaust outlet.

In various such embodiments, the fastener-driving tool further includes an EGR conduit in fluid communication with the EGR valve recirculation outlet, the EGR conduit comprising an EGR conduit outlet.

In various such embodiments of the fastener-driving tool, part of the EGR conduit is adjacent the fuel-dispensing conduit.

In various such embodiments of the fastener-driving tool, the EGR conduit is positioned such that at least some of any fluid exiting the EGR conduit outlet contacts at least part of the fuel-dispensing conduit.

In various such embodiments of the fastener-driving tool, the housing defines an air chamber in fluid communication with the EGR conduit outlet.

In various such embodiments, the fastener-driving tool further includes a first valve configured to enable fluid to flow from the atmosphere into the air chamber and to prevent fluid from flowing from the air chamber to the atmosphere through the first check valve.

In various such embodiments, the fastener-driving tool further includes a second valve configured to enable fluid to flow from the air chamber to the first combustion chamber and to prevent fluid from flowing from the first combustion chamber to the air chamber.

In various such embodiments, the fastener-driving tool further includes a third valve configured to enable fluid to flow from the air chamber to the second combustion chamber and to prevent fluid from flowing from the second combustion chamber to the air chamber.

In various such embodiments of the fastener-driving tool, each of the first, second, and third valves is a check valve.

In various such embodiments, the fastener-driving tool further includes an EGR conduit check valve configured to enable fluid to flow from the EGR valve recirculation outlet through the EGR conduit to the air chamber and to prevent fluid from flowing from the air chamber through the EGR conduit to the EGR valve recirculation outlet.

In various such embodiments of the fastener-driving tool, the EGR valve further comprises an EGR valve piston chamber outlet in fluid communication with a piston chamber conduit that is in fluid communication with the piston chamber, wherein the EGR valve enables fluid to flow from the EGR valve inlet to the EGR valve piston chamber outlet when in the open configuration and prevents fluid from flowing from the EGR valve inlet to the EGR valve piston chamber outlet when in the closed configuration.

In various such embodiments, the fastener-driving tool further includes a check valve in fluid communication with the piston chamber conduit and configured to enable fluid to flow from the EGR valve piston chamber outlet through the piston chamber conduit to the piston chamber and to prevent fluid from flowing from the piston chamber through the piston chamber conduit to the EGR valve piston chamber outlet.

In various such embodiments of the fastener-driving tool, the first volume is 1.4% to 7.4% of the second volume.

In various such embodiments of the fastener-driving tool, the first volume is 2.4% to 3.7% of the second volume.

It should also be appreciated from the above, that in various embodiments, the present disclosure provides a fastener-driving tool comprising: a housing; a set of components at least partially within the housing that define a combustion chamber having a first volume; a spark generator configured to generate a spark within the first combustion chamber; a cylinder within the housing and defining a piston chamber that is in fluid communication with the combustion chamber; a piston in the piston chamber and movable relative to the cylinder between a pre-firing position and a firing position; a driver blade attached to the piston; and an exhaust gas recirculation (EGR) valve comprising an EGR valve inlet and an EGR valve recirculation outlet, wherein the EGR valve inlet is in fluid communication with the piston chamber via an EGR opening defined through the cylinder.

In various such embodiments, the fastener-driving tool further includes a fuel-dispensing system having a fuel-dispensing conduit in fluid communication with the combustion chamber, the fuel-dispensing conduit comprising a fuel-dispensing conduit outlet.

In various such embodiments of the fastener-driving tool, the fuel-dispensing conduit is sized and shaped to route fuel from an outlet of a fuel canister to the fuel-dispensing conduit outlet.

In various such embodiments, the fastener-driving tool further includes a workpiece-contact element movable relative to the housing between an extended position and a retracted position; and one or more mechanical linkages connecting the workpiece-contact element to the fuel-dispensing system such that, when the fuel canister is received in the fuel-dispensing system, movement of the workpiece-contact element from the extended position to the retracted position causes the fuel to be dispensed from the outlet of the fuel canister into the fuel-dispensing conduit.

In various such embodiments of the fastener-driving tool, the EGR valve is movable between an open configuration in which the EGR valve enables fluid to flow from the EGR valve inlet to the EGR valve recirculation outlet and a closed configuration in which the EGR valve prevents fluid from flowing from the EGR valve inlet to the EGR valve recirculation outlet.

In various such embodiments of the fastener-driving tool the EGR valve further comprises an EGR valve exhaust outlet in fluid communication with an exhaust conduit that is in fluid communication with the atmosphere, wherein the EGR valve enables fluid to flow from the EGR valve inlet to the EGR valve exhaust outlet when in the open configuration and prevents fluid from flowing from the EGR valve inlet to the EGR valve exhaust outlet when in the closed configuration.

In various such embodiments, the fastener-driving tool further includes a check valve in fluid communication with the exhaust conduit and configured to enable fluid to flow from the EGR valve exhaust outlet through the exhaust conduit to the atmosphere and to prevent fluid from flowing from the atmosphere through the exhaust conduit to the EGR valve exhaust outlet.

In various such embodiments, the fastener-driving tool further includes an EGR conduit in fluid communication with the EGR valve recirculation outlet, the EGR conduit comprising an EGR conduit outlet.

In various such embodiments of the fastener-driving tool, the part of the EGR conduit is adjacent the fuel-dispensing conduit.

In various such embodiments of the fastener-driving tool, the EGR conduit is positioned such that at least some of any fluid exiting the EGR conduit outlet contacts at least part of the fuel-dispensing conduit.

In various such embodiments of the fastener-driving tool, the housing defines an air chamber in fluid communication with the EGR conduit outlet.

In various such embodiments, the fastener-driving tool further includes a first valve configured to enable fluid to flow from the atmosphere into the air chamber and to prevent fluid from flowing from the air chamber to the atmosphere through the first check valve.

In various such embodiments, the fastener-driving tool further includes a second valve configured to enable fluid to flow from the air chamber to the combustion chamber and to prevent fluid from flowing from the combustion chamber to the air chamber.

In various such embodiments, the fastener-driving tool further includes an EGR conduit check valve configured to enable fluid to flow from the EGR valve recirculation outlet through the EGR conduit to the air chamber and to prevent fluid from flowing from the air chamber through the EGR conduit to the EGR valve recirculation outlet.

In various such embodiments of the fastener-driving tool, the EGR valve further includes an EGR valve piston chamber outlet in fluid communication with a piston chamber conduit that is in fluid communication with the piston chamber, wherein the EGR valve enables fluid to flow from the EGR valve inlet to the EGR valve piston chamber outlet when in the open configuration and prevents fluid from flowing from the EGR valve inlet to the EGR valve piston chamber outlet when in the closed configuration.

In various such embodiments, the fastener-driving tool further includes a check valve in fluid communication with the piston chamber conduit and configured to enable fluid to flow from the EGR valve piston chamber outlet through the piston chamber conduit to the piston chamber and to prevent fluid from flowing from the piston chamber through the piston chamber conduit to the EGR valve piston chamber outlet.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a fastener-driving tool including a housing, a combustion chamber in the housing, a cylinder in the housing, an air chamber, a piston chamber in the cylinder, a piston in the piston chamber and movable relative to the cylinder from a pre-firing position to a firing position and back to the pre-firing position, and a driver blade attached to the piston, said method comprising:

communicating a first portion of exhaust gases from the combustion chamber to atmosphere via an exhaust conduit;

communicating a second portion of the exhaust gases out of the combustion chamber and then back to the combustion chamber; and communicating a third portion of exhaust gases from the piston chamber to the combustion chamber through use of an exhaust gas recirculation system comprising an exhaust gas recirculation conduit connecting the piston chamber and the combustion chamber and a plurality of outlets, wherein the exhaust gas recirculation system is configured to promote the flow of exhaust gases and is capable of being in fluid communication with the air chamber, the atmosphere, the cylinder, and the piston chamber via the plurality of outlets.

2. The method of operating a fastener-driving tool of claim 1, wherein the exhaust gas recirculation system controls the communication of the first portion of exhaust gases and the communication of the second portion of the exhaust gases via an exhaust gas recirculation valve in the housing.

3. The method of operating a fastener-driving tool of claim 1, wherein communicating the second portion of the exhaust gases back to the combustion chamber includes communicating the second portion of the exhaust gases first to the combustion chamber through the air chamber.

4. A method of operating a fastener-driving tool including a housing, an air chamber in the housing, a first combustion chamber in the housing, a second combustion chamber in the housing, a cylinder in the housing, a piston chamber in the cylinder, a piston in the piston chamber and movable relative to the cylinder from a pre-firing position to a firing position and back to the pre-firing position, and a driver blade attached to the piston, said method comprising:

communicating a first portion of exhaust gases from the second combustion chamber to atmosphere via a first conduit connecting the second combustion chamber and the atmosphere;

communicating a second portion of the exhaust gases from the second combustion chamber to the air chamber via a second conduit connecting the second combustion chamber and the air chamber; and communicating a third portion of the exhaust gases from the second combustion chamber to the piston chamber via a third conduit connecting the second combustion chamber and the piston chamber to assist in returning the piston back to the pre-firing position.

5. The method of operating a fastener-driving tool of claim 4, which includes communicating portions of the second portion of the exhaust gases in the air chamber to the first combustion chamber and to the second combustion chamber.

6. The method of operating a fastener-driving tool of claim 1, wherein the exhaust gas recirculation system comprises a controller to control the flow of exhaust gases.

7. The method of operating a fastener-driving tool of claim 4, further comprising an exhaust gas recirculation to facilitate the flow of the third portion of exhaust gases through the third conduit.

8. The method of operating a fastener-driving tool of claim 7, wherein the exhaust gas recirculation facilitates the flow of the second portion of exhaust gases through the second conduit.

9. The method of operating a fastener-driving tool of claim 8, wherein the exhaust gas recirculation facilitates the flow of the first portion of exhaust gases through the first conduit.

* * * * *